May 5, 1925.
H. J. BENTSON
TRACTOR BELT CONSTRUCTION
Filed Nov. 10, 1919    3 Sheets-Sheet 1
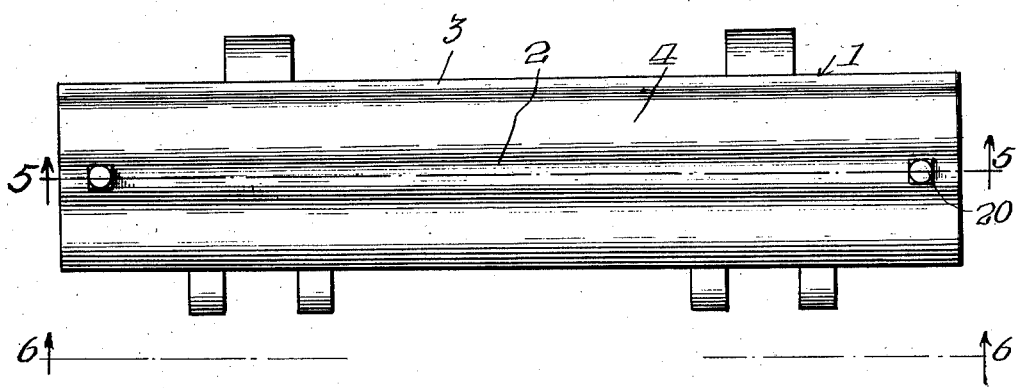
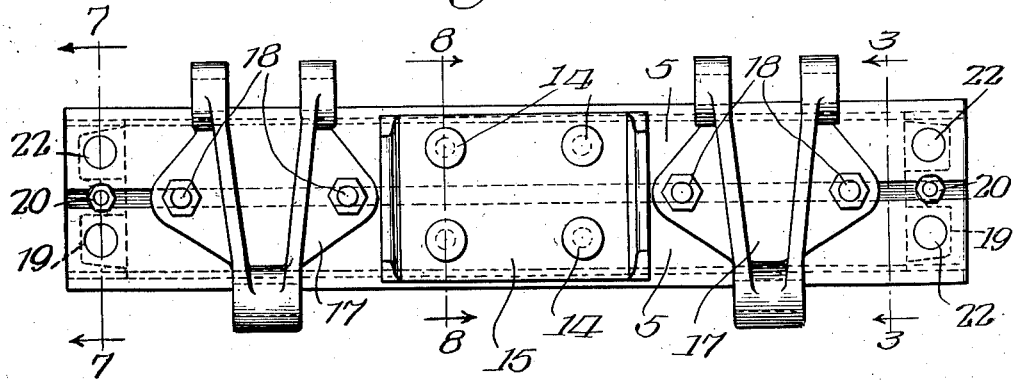
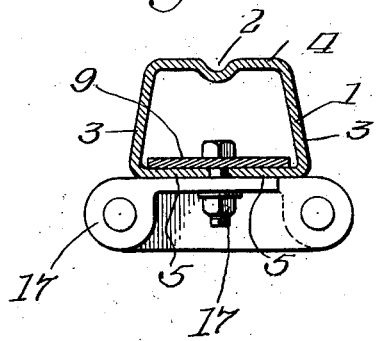
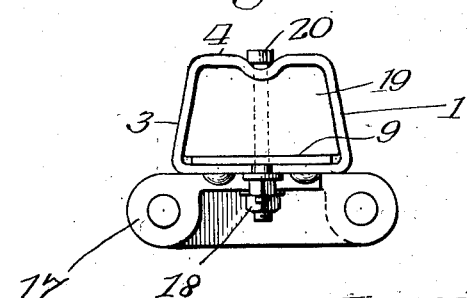
Inventor
H. J. Bentson
By Arthur A. Durand
Atty.

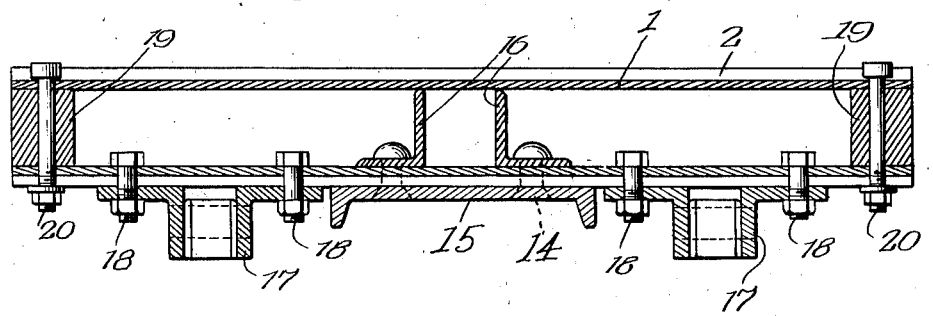
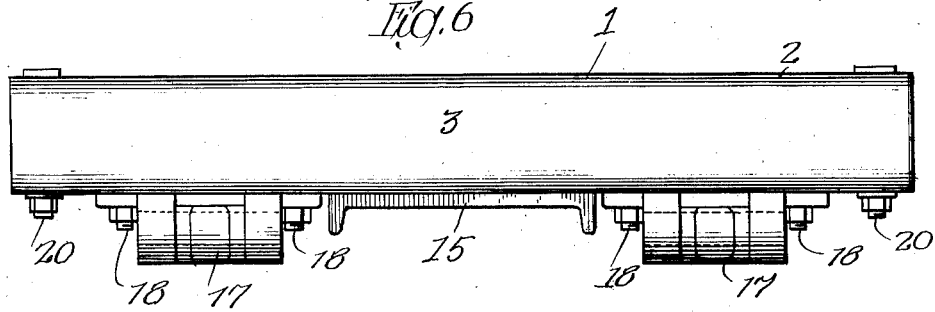
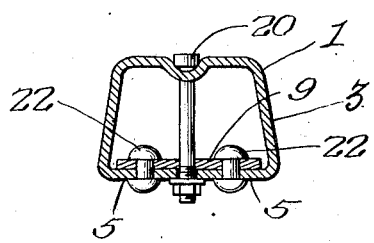
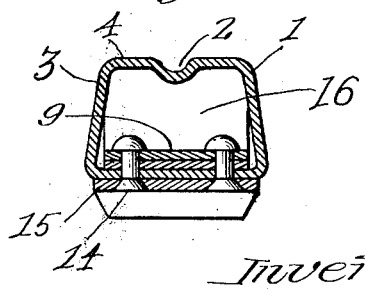

May 5, 1925.
H. J. BENTSON
TRACTOR BELT CONSTRUCTION
Filed Nov. 10, 1919  3 Sheets-Sheet 3
1,536,604
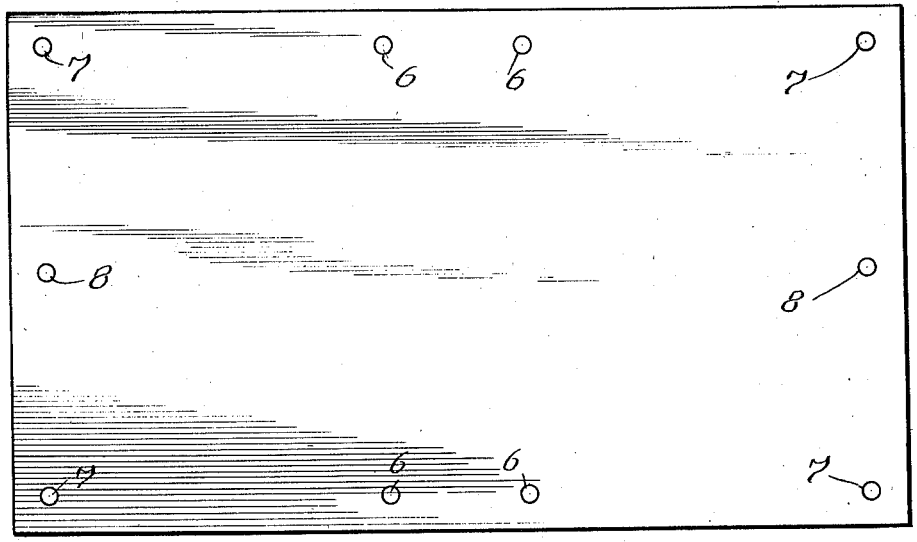
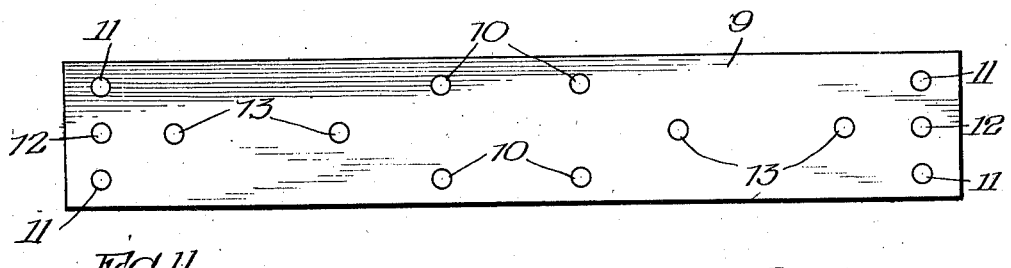
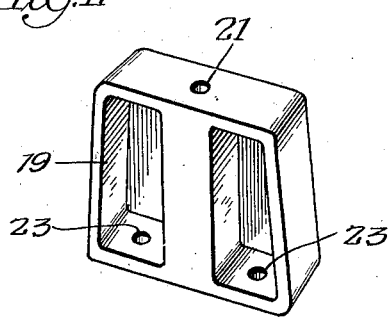
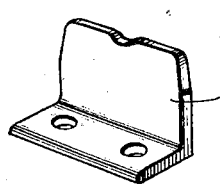
Inventor
H. J. Bentson
By Arthur H. Durant Patented May 5, 1925.

1,536,604

UNITED STATES PATENT OFFICE.

HANS J. BENTSON, OF KENOSHA, WISCONSIN, ASSIGNOR, BY MESNE ASSIGNMENTS, TO F. C. AUSTIN MACHINERY COMPANY, A CORPORATION OF ILLINOIS.

TRACTOR BELT CONSTRUCTION.

Application filed November 10, 1919. Serial No. 337,100.

*To all whom it may concern:*

Be it known that I, HANS J. BENTSON, a citizen of the United States of America, and a resident of Kenosha, Wisconsin, have invented a certain new and useful Improvement in Tractor Belt Constructions, of which the following is a specification.

This invention relates to the tread members of traction belts, these members being commonly known as the slats of the belt. Ordinarily said members are made solid and are secured to the sprocket chains or link belts, so that the traction belt is of the desired breadth and character.

Generally stated, the object of the invention is to provide an improved construction and arrangement whereby said tread members or slats can be made from sheet metal, in a manner that will render them comparatively easy to attach and detach, so that repairs can be made readily when necessary or desirable.

It is also an object to provide a construction which will be strong and substantial, but at the same time of less weight than heretofore.

It is also an object to provide certain details and features of construction and combinations tending to increase the general efficiency and the desirability of a traction belt of this particular character.

To these and other useful ends the invention consists in matters hereinafter set forth and claimed and shown in the accompanying drawings, in which—

Fig. 1 is a face view of a tread member or slat member embodying the principles of the invention.

Fig. 2 is a view of the opposite or base side of said tread member.

Fig. 3 is a cross section on line 3—3 in Fig. 2.

Fig. 4 is an end elevation of the structure shown in Fig. 1.

Fig. 5 is a longitudinal section on line 5—5 in Fig. 1.

Fig. 6 is a side elevation of the structure shown in Figs. 1 and 2.

Fig. 7 is a transverse section on line 7—7 in Fig. 2.

Fig. 8 is a transverse section on line 8—8 in Fig. 2.

Fig. 9 is a plan of the sheet metal blank from which the slat or tread member is made.

Fig. 10 is a plan of the sheet metal batten which is a part of the general structure of the slat or tread member.

Fig. 11 is a perspective of one of the castings which are employed to close the ends of the hollow slat or tread member, and to reinforce the same.

Fig. 12 is a perspective of one of the small sections of angle iron which are employed to reinforce the central portion of the said slat or tread member.

As thus illustrated, the invention comprises a sheet metal slat or tread member 1 which has a longitudinal groove 2 in the face thereof, to stiffen the tread portion and insure better traction, it being understood that the surface containing the groove 2 makes contact with the ground when the traction belt travels along in the ordinary and well known manner. The sides 3 of the hollow slat or tread member thus provided preferably converge toward the tread surface 4 which contains the said groove, so that in cross section the slat or tread member is somewhat wedge-shaped in character, having a wider base than tread. The two portions 5 are brought together in the same plane, with the edges thereof spaced slightly apart. The sheet metal slat or tread member thus constructed is made from the blank shown in Fig. 9, being formed with holes 6 in the central portion thereof, and with holes 7 and 8 at the ends.

A batten in the form of a straight strip 9 of sheet metal is placed inside of the slat or tread member over the slot formed between the edges of the portions 5, said batten being provided centrally with holes 10, and at its ends with holes 11 and 12, as well as the holes 13 between the center and ends.

With this construction and arrangement of the sheet metal, the holes 10 register with the holes 6 and are occupied by the rivets 14 which hold the track member 15 in place, which latter, it will be understood, forms a part of the central track on the inside of the traction belt, upon which track rest the wheels (not shown) of the truck which supports the load weight of the vehicle. Therefore, these rivets not only secure the track member 15 in place, but also secure the batten 9 in place, and serve to hold the portions 5 in their proper relative positions. It will also be seen that the angle iron sections 16 (see Fig. 12) are held by the rivets 14 in place within the slat or tread member, these angle iron pieces fitting the interior of the hollow slat or tread member, to keep the latter from being crushed under the weight imposed thereon when on the ground.

The chain links 17 are of any suitable character, and are held in place by bolts 18 which extend between the edges of the portions 5, and through the holes 13 of the batten. Thus each unit of the traction belt comprises a hollow sheet metal slat or tread member, having its individual track member at the center thereof, and having two links removably attached thereto, so that any tread member or slat can be removed at will.

The outer ends of the hollow slat or tread member are preferably closed by blocks or fillers in the form of castings 19 which fit snugly within the ends of the sheet metal structure. Bolts 20 extend through the hole 21 in said block or filler, and through the holes 8 and 12 previously mentioned, their heads being disposed in the grooves 2 in the face of the tread member 1; and, in addition, rivets 22 are inserted through the previously mentioned holes 7 and 11, and through the holes 23 of said block or casting, thus rigidly securing the structure together at the ends of the slat or tread member, and closing the latter against the entrance of mud or dirt. The bolts 20, it will be seen, extend between the edges of the portions 5 of the sheet metal.

From the foregoing it will be seen that sheet metal is conveniently and advantageously employed in the construction of a traction slat or tread, in a manner to insure both lightness and strength, so that while the belt as a whole will be lighter, it will not be any the less strong and serviceable in use. The hollow sheet metal treads, or slats as they are called, are individually removable from the two sprocket chains forming the endless link belt, so that new slats or treads can be substituted for those which become worn or impaired by usage. The sheet material, of course, can be of steel or any other sheet material which will best serve the purpose. The track member 15 can be a short section of channel iron (see Fig. 5), if desired, and the links 17 can be cast or formed in any suitable or desired or known or approved manner. The batten 9 covers the joint formed between the edges of the portions 5, in what is properly called the base of the slat or tread member, it being the base portion which is secured to the sprocket chains or endless link belt, while the face or tread 4 which is farthest from the sprocket chains is adapted to engage the ground.

What I claim as my invention is:—

1. A multi-pedal traction belt tread unit, comprising a hollow sheet metal member bent to substantially tubular form with the edges thereof in juxtaposition, and means extending between said edges for securing said member to the belt with the closed side thereof toward the ground.

2. A structure as specified in claim 1, said member having a base formed of superposed thicknesses of sheet metal.

3. A structure as specified in claim 1, said member having a longitudinal inward groove in the tread thereof, and bolts inserted through the member to hold the sheet metal in place, said bolts having their heads disposed in said groove.

4. A structure as specified in claim 1, said member having superposed base portions, and said means including bolts inserted through said base to secure links of said belt to said member.

5. A structure as specified in claim 1, said member having means inside thereof to prevent collapse of the sheet metal under load pressure.

6. A structure as specified in claim 1, said member having closures for the ends thereof, links of said belt secured thereto and a load weight sustaining member on the center thereof.

7. A traction belt tread member formed of sheet metal having the edges thereof brought into juxtaposition, a strip superposed on the sheet metal to cover said edges, and fastening means extending through the strip and sheet metal, whereby the member is tubular in form, with a battened joint along the base thereof, and bolts to secure said base to the belt.

8. A structure as specified in claim 7, said bolts extending between said edges of the sheet metal.

9. A structure as specified in claim 7, said member being formed from a rectangular blank having holes punched therein for said fastening means and bolts.

10. A structure as specified in claim 1, said member being longitudinally inwardly grooved throughout the length of the tread thereof to stiffen the member against distortion under the load weight.

11. In a multi-pedal traction construction, a hollow sheet metal tread member of substantially tubular form for the endless belt, and means for securing said member to the belt in combination with fillers for the ends of the hollow sheet metal tread member fitting snugly therein, and means to hold said fillers in place.

12. In a multi-pedal traction construction, a hollow sheet metal tread member of substantially tubular form for the endless belt, and means for securing said member to the belt in combination with means fitting snugly the interior of the hollow sheet metal tread member at the central portion thereof to prevent collapse, or crushing of the sheet metal under the load weight.

13. In a multi-pedal traction construction, a hollow sheet metal tread member for the endless belt, and means for securing said member to the belt, said means comprising a plate positioned within said tread member and extending between adjacent edges thereof, and bolts extending through said plate and between said edges to detachably secure the tread member to a plurality of parallel links of said endless belt.

14. In multi-pedal traction construction, a link belt, a hollow, one-piece sheet metal tread member having its edges bent to adjacent relationship and forming of itself a substantially closed unit, and means for permanently attaching the base of said member to a link of said belt.

HANS J. BENTSON.